United States Patent [19]
Palombit

[11] Patent Number: 4,780,935
[45] Date of Patent: Nov. 1, 1988

[54] SECUREMENT STRAP

[76] Inventor: Leroy C. Palombit, 3608 Conlin Ave., Evansville, Ind. 47715

[21] Appl. No.: 165,005

[22] Filed: Mar. 7, 1988

[51] Int. Cl.⁴ ............................................. B65D 63/00
[52] U.S. Cl. ................................ 24/16 PB; 24/17 AP
[58] Field of Search ........... 24/16 PB, 17 AP, 30.5 P; 248/74.3

[56] References Cited
U.S. PATENT DOCUMENTS 3,006,048 10/1961 Windish .............................. 24/16 PB
3,059,645 10/1962 Hasbrouck et al. ................. 24/16 PB
3,197,830 8/1965 Hoadley ............................... 24/16 PB

FOREIGN PATENT DOCUMENTS 1080617 12/1954 France .............................. 24/16 PB
1237836 6/1960 France .............................. 24/16 PB Primary Examiner—Victor N. Sakran
Attorney, Agent, or Firm—Warren D. Flackbert

[57] ABSTRACT

A securement strap for a bundled filament member, such as an electrical cord, characterized by a strip having an arrangement at one end for securing the strap at a desired location on the filament member, and a further arrangement for locking portions of the strip together after the filament member has been bundled, i.e. in an encircling and confining relationship. Provision is made for readily extending the length of the strip to accommodate a particular use condition, i.e. the size of the bundled article.

7 Claims, 1 Drawing Sheet

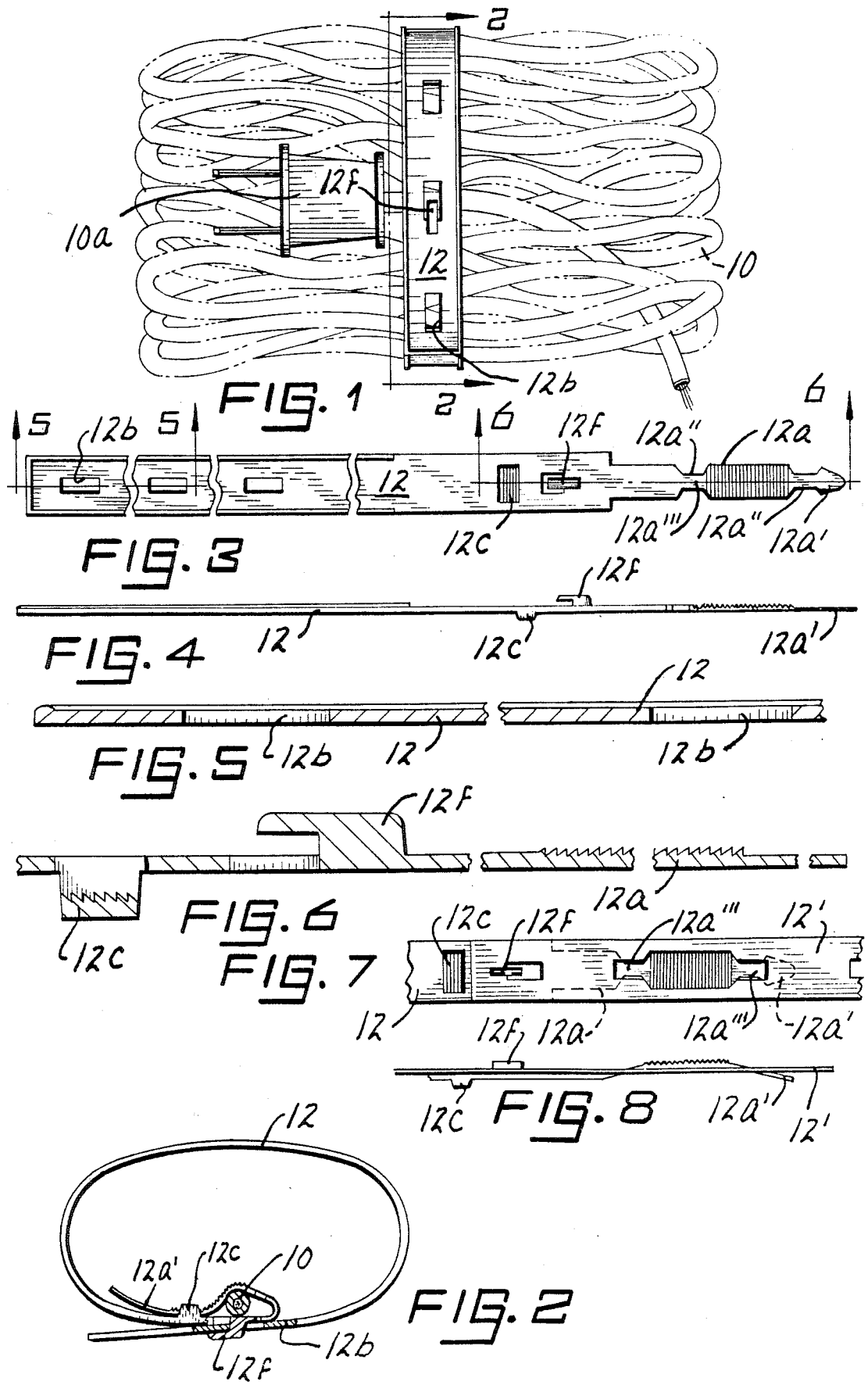

SECUREMENT STRAP

As is known, the assembly of a flexible filament type member, such as an electrical cord, cable or rope, as bundling into compact lengths is oftentimes a necessity as for storage, transporting, space requirements at a use site, and the like. In this latter connection, and by way of example, the flexible filament type member is typically folded back on itself in a succession of passes and, thereafter, maintained in such a folded or bundled condition by an independent tie segment.

A need has arisen for a more positive assembly arrangement because of the inherent difficulty of maintaining the tie segment in a fastening position and/or even the loss of such when removed from a use condition.

The invention presents an improvement in a securement strap which maintains positive placement, in an encircling relationship with the involved article, such as the aforementioned flexible filament type member, where, at the same time, the latter is maintained at a desired exposed length satisfying use, storage and transporting requirements.

Basically, the securement strap herein is in the form of an elongated flexible strip presenting a series of spaced apart openings. One side of the strip includes a raised bridge adapted to receive and positively retain the inserted free end of the strip at an operative position, where ribbed or serrated areas serve to prevent slippage. A hook or retainer, disposed on the opposite side of the strip, serves to cooperatively engage one of the openings in the strip to maintain securement about a bundled article.

In other words, in a first operational stage, the securement strap is positioned at a desired location on the article, followed by article bundling and, thereafter, the use of the hook and/or retainer in combination with an opening to overlie the completely bundled article.

Additionally, provision is made for the simple expanding of the length of the securement strap. In this connection, a free end of the strip is threaded through and along adjacent openings, where another opening receives the hook or retainer in a positive assembled relationship. The aforesaid feature adds to the utility of the invention.

In any event, a better understanding of the present invention will become more apparent from the following description, taken in conjunction with the accompanying drawing, wherein

DESCRIPTION OF THE FIGURES

FIG. 1 is a top plan view of a securement strap in accordance with the teachings of the present invention and shown in a use condition;

FIG. 2 is a side view of the instant securement strap, taken at line 2—2 on FIG. 1 and looking in the direction of the arrows;

FIG. 3 is a top plan view of the securement strap of the invention in a flattened condition;

FIG. 4 is another view of the instant securement strap, detailing such, and looking from the bottom to the top of FIG. 3;

FIG. 5 is an enlarged view in vertical section, taken at line 5—5 on FIG. 3 and looking in the direction of the arrows, further detailing the invention;

FIG. 6 is yet another enlarged view in vertical section, in this instance taken at line 6—6 on FIG. 3 and looking in the direction of the arrows, still further detailing the invention;

FIG. 7 is a partial top plan view of the instant securement strap illustrating the lengthening of such for a desired use; and, FIG. 8 is a view in side elevation, looking from the bottom to the top of FIG. 7, again further detailing the invention.

For the purposes of promoting an understanding of the principles of the invention, reference will now be made to the embodiment illustrated in the drawing and specific language will be used to describe the same. It will nevertheless be understood that no limitations of the scope of the invention is thereby intended, such alterations and further modifications in the illustrated device, and such further applications of the principles of the invention as illustrated therein being contemplated as would normally occur to one skilled in the art to which the invention relates.

Referring now to FIGS. 1 to 6, inclusive, a securement strap in accordance with the teachings of the invention is defined by a relatively narrow and thin elongated strip or body 12, typically made from a plastic resin. One end 12a of the strip 12 is narrower than the remainder and, preferably, includes a pointed free end 12a' and opposing pairs of edge notches or cut-outs 12a", all for reasons to be discussed herebelow.

A series of openings or cut-outs 12b is disposed along the main portion of the strip 12, where a bridge or upstanding inverted U-shaped member 12c is disposed on one surface thereof adjacent the end 12a. The undersurface of the bridge 12c includes serrations or ribs cooperable with serrations or ribs on the surface opposite to that on which the bridge 12c is disposed, but on end 12a.

The preceding relationship, as apparent in FIG. 2, permits the securement strap to be initially secured around any preselected portion of an article 10 intended to be bundled, as, for example, on an electrical line adjacent a connector 10a (see FIG. 1). In other words, the narrow end 12a of the strip or body 12 is folded to encircle the preselected portion of the article and, thereafter, inserted beneath the bridge 12c into a positive securing relationship, where the latter is achievable through interaction between the serrated or ribbed portions on the inside of the bridge 12c and on the opposing surface of the end 12a.

A hook or retainer 12f extends outwardly from and along the longitudinal axis of the body or strip 12 proximate the end 12a thereof. A significant reason for the hook or retainer 12f is to engage (and be received in) one of the openings 12b along the length of the strip 12, i.e. to maintain the bundle of encircled article 10 therewithin (see FIGS. 1 and 2). In other words, the invention achieves simple article containment for storage, transporting or whatever.

Looking now at FIGS. 3, 7 and 8, an arrangement is disclosed therein for enlarging the length of the securement strap. In this instance, the enlarged strap is similar to the strap disclosed in FIG. 3, but an extra length of strip 12' employed (overlying, with respect to each other, at a use condition).

In other words, one of the openings or cut-outs 12b (the one furthest from end 12a) is engaged or locked by a hook or retainer 12f. Neck portions 12a''', resulting from notches or cut-outs 12a''', fit into the next adjacent in-line openings or cut-outs 12b in strip 12', as by the threading of the free pointed end 12a', achieving a locked and extended relationship between strip 12' and strip 12 (see FIGS. 7 and 8). In other words, the preceding satisfies particular use demands, and in totally encircling and confining on article, the operational sequence is the same as that described hereabove.

From the preceding, it should be evident that the securement strap presented herein is adaptable for a wide range of end uses, particularly where, for example, the bundling of a filament type member is involved. In any event, the strap is initially secured to the article, bundling of the latter thereafter accomplished, and the strap positively positioned in an overlying relationship through locking action which accommodates for bundle size. As further apparent, the securement is readily enlarged lengthwise so as to provide further versatility in a use condition.

The securement strap described hereabove is susceptible to various changes within the spirit of the invention including, by way of example, in proportioning; the type of material employed; the precise configuration of the hooks and/or retainers, the in-line openings and the notches; the manner or "roughening" in the area for positive surface contact during assembly; and, the like. Thus, the preceding should be considered illustrative and not as limiting the scope of the following claims:

I claim:

1. A securement strap comprising a body in the form of an elongated flexible strip having a top surface and a bottom surface, one end of said strip being narrower than the remainder of said strip and including a roughened upper surface area, a bridge member extending downwardly from said bottom surface of said strip proximate said one end, said bridge member including a roughened inner surface area, said narrow end of said strip adapted to encircle a selected portion of a pre-bundled article in a retained relationship with said bridge member, a series of openings disposed along and through said strip, and a hooking member extending from said upper surface of said strip and adapted to be received in and secure one of said openings in an encircling and confining relationship with said article after bundling.

2. The securement strap of claim 1 where a second strip also has an end narrower than the remainder and includes opposing notch portions presenting neck areas and another hooking member partly underlying an end of said strip, whereby said another hooking member is received in an opening in said strip and said neck areas extend through adjacent openings in said strip in a securing and strap extending relationship.

3. The securement strap of claim 1 where said one end of said strip includes opposing notch portions presenting neck areas.

4. The securement strap of claim 1 where said hooking member extends upwardly and away from said one end.

5. The securement strap of claim 2 where said hooking member extends upwardly and away from said end of said second strip.

6. The securement strap of claim 3 where said strip and said second strip are cooperably interchangeable.

7. The securement strap of claim 1 where said one end of said strip is inserted within said bridge member.

* * * * *